(12) United States Patent
Raju

(10) Patent No.: US 7,895,385 B2
(45) Date of Patent: Feb. 22, 2011

(54) ESTABLISHING COMMUNICATION OVER SERIAL BUSES IN A SLAVE DEVICE

(75) Inventor: Arun B Raju, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 45 days.

(21) Appl. No.: 12/330,522

(22) Filed: Dec. 9, 2008

(65) Prior Publication Data

US 2010/0146173 A1 Jun. 10, 2010

(51) Int. Cl.
*G06F 13/14* (2006.01)
(52) U.S. Cl. .......................... 710/305; 713/1
(58) Field of Classification Search ................ 710/305, 710/306, 313, 8, 10–11, 18; 713/300, 340
See application file for complete search history.

(56) References Cited

U.S. PATENT DOCUMENTS

| | | | |
|---|---|---|---|
| 7,376,846 B2 * | 5/2008 | Hawkins et al. | |
| 7,505,461 B2 * | 3/2009 | Matsuda et al. | |
| 2004/0201647 A1 * | 10/2004 | Jackson Pulver et al. | |
| 2010/0057973 A1 * | 3/2010 | Barake et al. | |

OTHER PUBLICATIONS

"Battery Charging Specification", "USB Implementers Forum, Inc.", Dated: Mar. 8, 2007, pp. 1-29, Revision 1.0.
"Device Class Specification Adopters Agreement", Downloaded Circa: Mar. 10, 2007, pp. 1-5.

* cited by examiner

*Primary Examiner*—Clifford H Knoll

(57) ABSTRACT

In accordance with an aspect of the present invention, a slave device enters a state suitable for establishing communication with a host device only if additional information is received on a serial bus after receiving a reset signal on the same bus. Such a feature may avoid or reduce disruption to applications executing on a slave device when false reset signals are received, for example, when the slave device is connected to a dumb charger on a USB interface for charging.

20 Claims, 6 Drawing Sheets

ESTABLISHING COMMUNICATION OVER SERIAL BUSES IN A SLAVE DEVICE

BACKGROUND

1. Technical Field

The present disclosure relates to slave/external devices interfacing over serial buses and more specifically to establishing communication over such buses (e.g., USB) in the slave devices.

2. Related Art

Serial buses are often used to connect external devices to a host device. In general, a serial bus represents a bus in which data symbols/bits are transferred serially on a single signal path (implemented either using single ended signal or differential signal). Universal serial bus (USB) and I2C, well known in the relevant arts are examples of such serial buses.

The external devices are often referred to as slave devices since multiple slave devices are connected to the same host device and the host device controls the operation of the slave devices in several respects (e.g., such as allocating an address, determining speed of operation, etc.).

Communication needs to be established between a slave device and the host device before transfer of substantive data (i.e., the data used by various applications implemented in the devices). Establishing a communication implies making devices in the two sides ready for transfer of application specific data. Typical tasks in communication establishment include one or more related tasks such as synchronization, enumeration (identifies the various parameters, such as allocation of address, to communicate with the slave device), etc. In general, any necessary configurations are performed internal to both the devices, based on the exchanged/determined information to complete establishing Substantive data can be exchanged between the two devices once communication is thus established.

The communication is typically established soon after the slave device is plugged into a connector present in the host device. Establishing communication entails exchanging data packets consistent with the protocol specification to perform tasks such as enumeration, etc.

It is generally desirable that the logic underlying communication establishment meets the specific requirements of various environments in which the slave device is used.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A slave device provided according to an aspect of the present invention processes a reset signal received on a serial bus. The slave device checks for additional information on the bus before entering a state suitable for establishing communication with a host device. Such additional information may include, but not limited to, synchronization signals (typically sent first after the reset signal) and start of frame signal. If the additional information is not received, it is assumed that the reset signal is false one and slave device may continue with tasks being performed prior to reception of the reset signal.

Such a feature may avoid or reduce disruption to applications executing on a slave device when false reset signals are received, for example, when the slave device is connected to a dumb charger on a USB interface for charging.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. USB Interface

Figure 1:
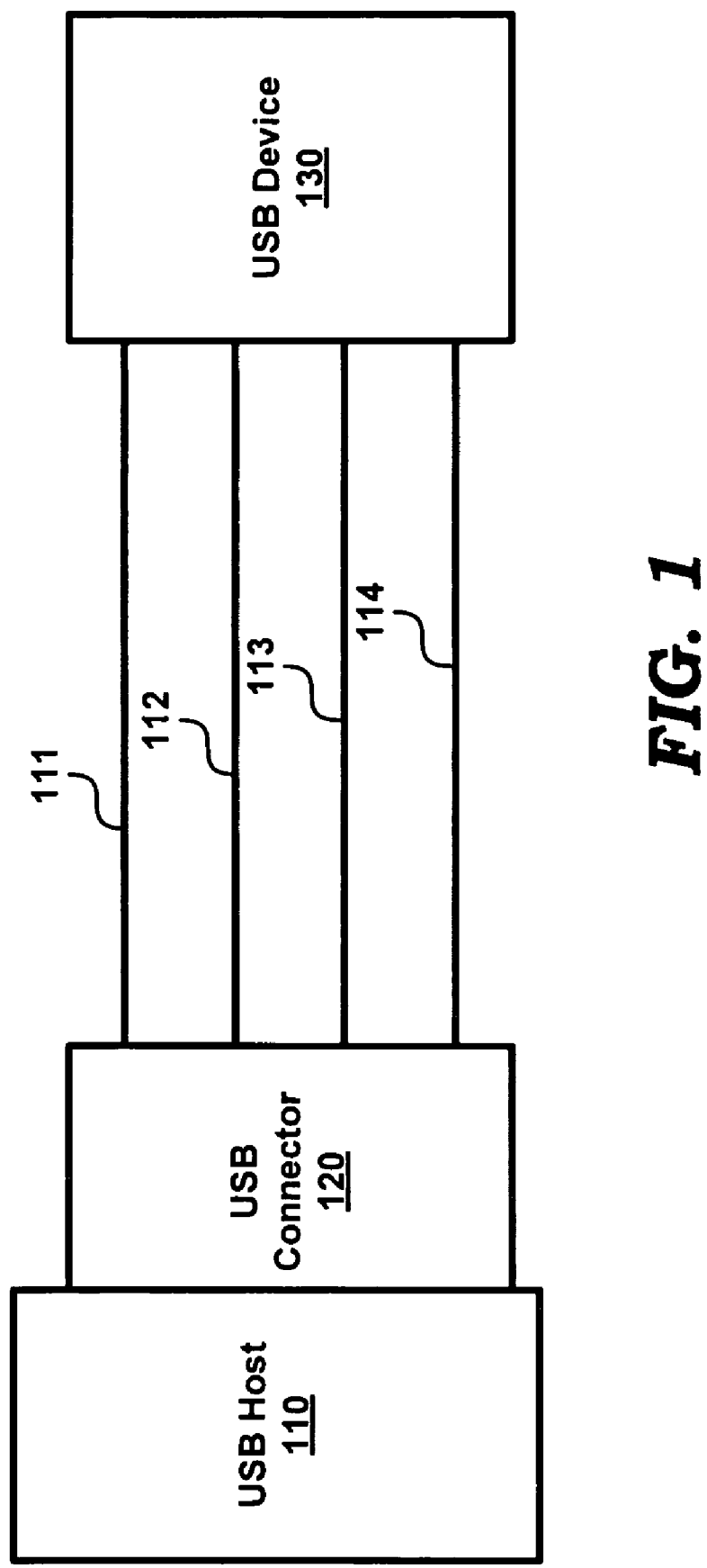
FIG. 1 is a block diagram illustrating the physical signal paths present according to USB interface in one embodiment.

FIG. 1 is a block diagram illustrating the physical signal paths present according to USB interface. It should be appreciated that several features of the invention are described with respect to USB merely for illustration. However, alternative embodiments can be implemented in the context of other bus protocols (including different versions of USB, etc.) without departing from the scope and spirit of the present invention, as will be apparent to one skilled in the relevant arts by reading the disclosure provided herein.

Slave device 130 is shown connected to host device 110 via connector 120. Connector 120 provides a physical receptor to a cable containing physical paths 111-114. Paths 111-114 respectively represent power (5 volts in case of USB), data+, data−, and ground paths. The two data paths are used to send signals in differential form in both directions, which are interpreted by the receiver.

Thus, once slave device 130 is physically connected to host device 110 by a cable or other medium, communication is established between the slave device and the host device by exchange of appropriate data/signals. An aspect of the present invention provides for establishing communication over serial buses. Accordingly, the manner in which communication is established in USB context is described first below.

3. Establishing Communication According to USB

Figure 2:
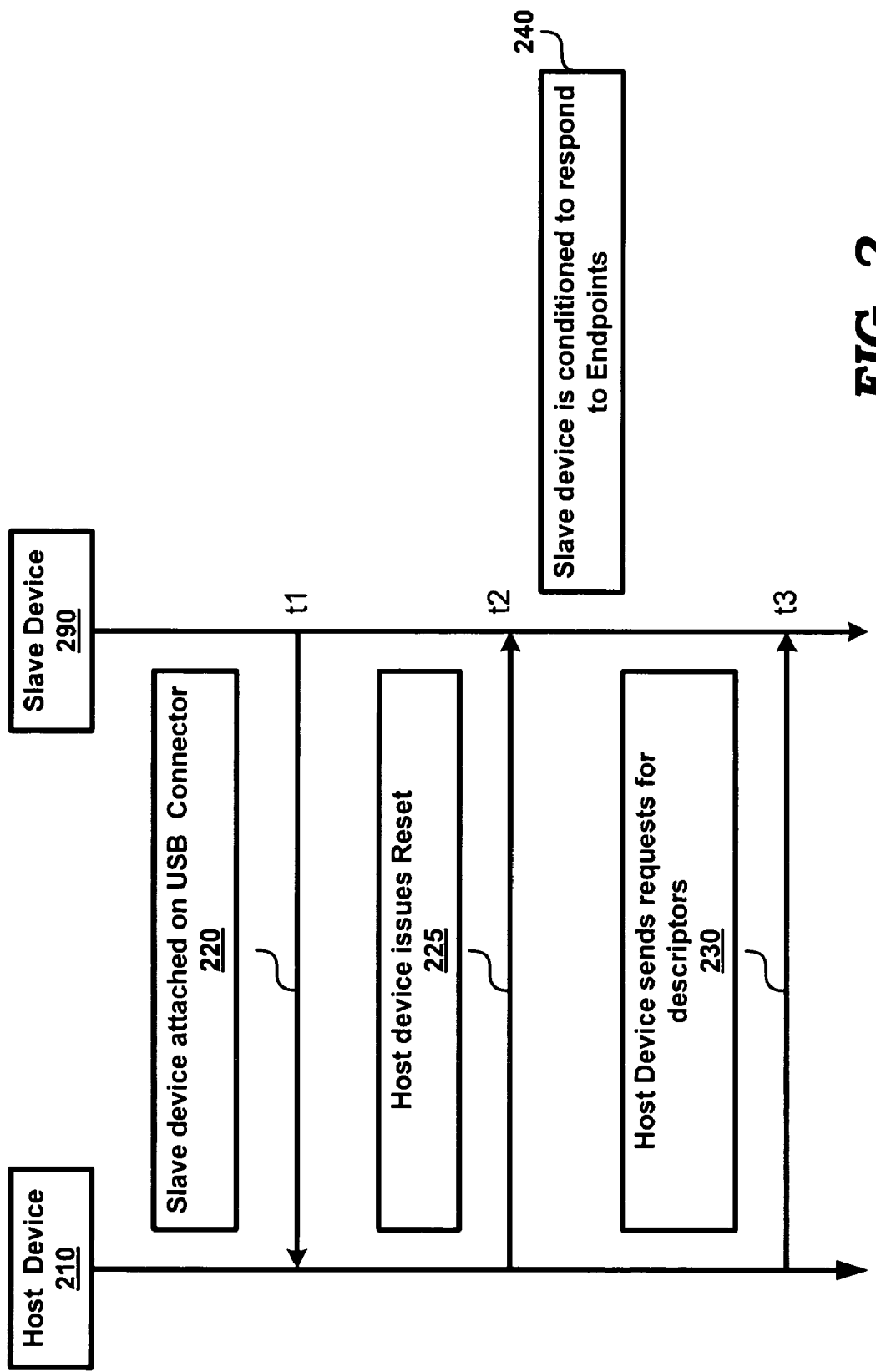
FIG. 2 is a flow diagram illustrating the manner in which connection is established in USB environment.

FIG. 2 is a flow diagram illustrating the manner in which connection is established in USB environment. The reader is referred to a document entitled, USB 2.0 Specification available @ http://www.usb.org/developers/docs/, for further details of USB.

Slave device 290 is shown attached/connected to USB connector/port at time instance t1, as indicated by 220. Host device 210 detects the connection and issues a reset signal at time instance t2, as indicated by 225. According to USB protocol, the reset (Reset is a condition where both D+ and D− are of logic low) signal is sent by sending a logic low (by shorting to ground) on each of paths 112 and 113.

In response to the reset signal, slave device 290 is reset to a default state (in a state suited for establishing communication according to a pre-specified protocol implemented in the specific environment). In case of USB, the default state corresponds to being conditioned to respond to any following host requests. The host device generally requests various information such as device descriptors (serial number, type of device, configured speeds of operation, packet size, etc.) for the slave device.

Thus, between time instances t2 and t3, slave device 290 is set to receive and decode the requests from the host device, as indicated by 240. In case of USB, the device is conditioned to response to various Control Endpoints. As is well known in the relevant arts, each request is represented as a burst/sequence of bits containing information to specific Endpoint. Each Endpoint is identified by specific sub-set of bits, i.e, Endpoint number. The slave device is accordingly placed in a state such that the burst of bits can be parsed and identified with respective Endpoints by endpoint number.

Thus, starting from time instance t3, the host device sends burst of data representing requests for descriptors. The slave device may provide the requested information to the host device. Such exchange of information is referred to as enumeration in the relevant arts.

Both the devices may thereafter perform any needed internal configurations to complete establishing communication. Once such communication is established, the applications at either end may request/send data to the other end based on the established communication.

Such an approach may lead to undesirable effects, as described below with an example.

4. Problem with Prior Approach

Figure 3:
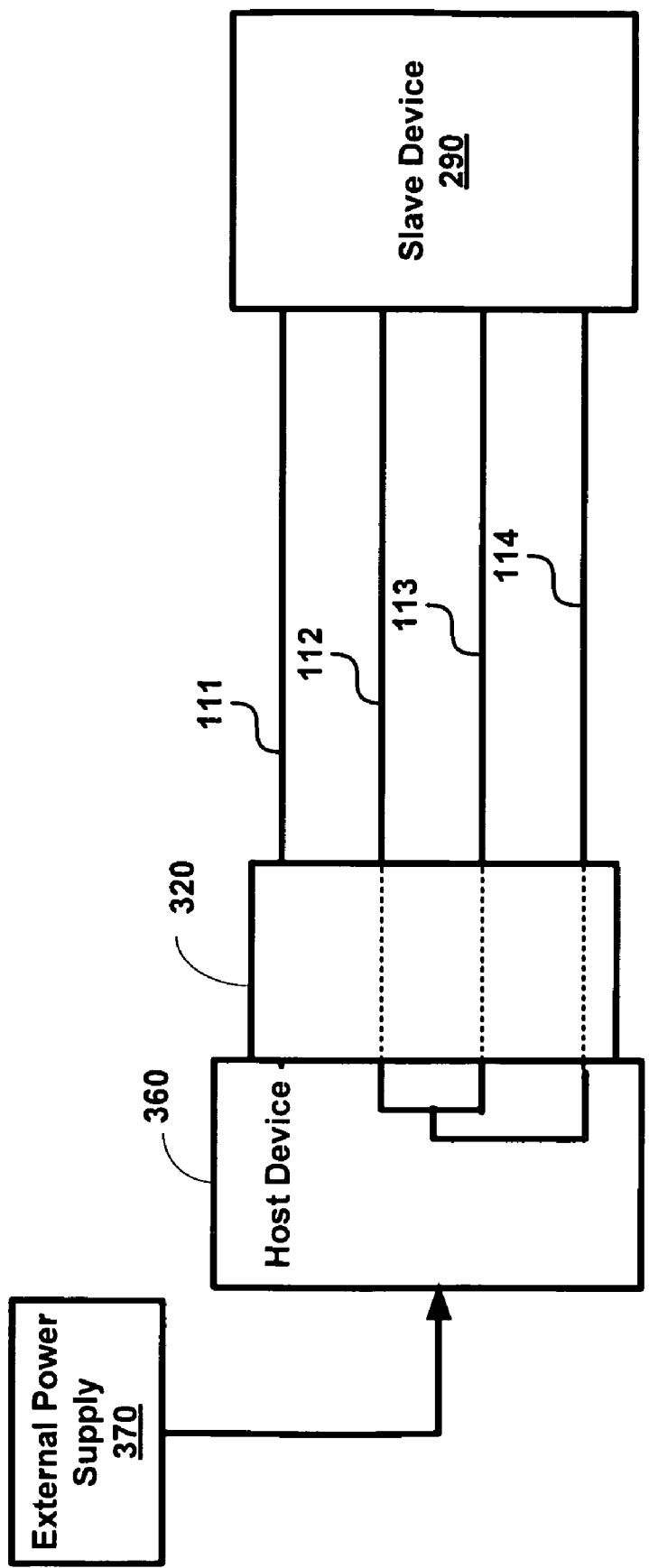
FIG. 3 is a block diagram illustrating the configuration when a slave device is connected to a dumb charger in an embodiment.

One problem with a prior approach to establishing connection can be understood when a dumb charger is used in place of USB host 110/host device 210, as illustrated with respect to FIG. 3. The charger (360) is generally used to charge the battery in slave/USB device (or provide power, in general) and does not provide any other substantive functions (e.g., enumeration or data transfers thereafter).

As required by applicable standard, "Battery Charging Specification, Revision 1.0" Dated Mar. 8, 2007, by USB Implemented Forum, Inc., dumb chargers short data signals 112 and 113 to ground path 114, as shown in FIG. 3.

Figure 4:
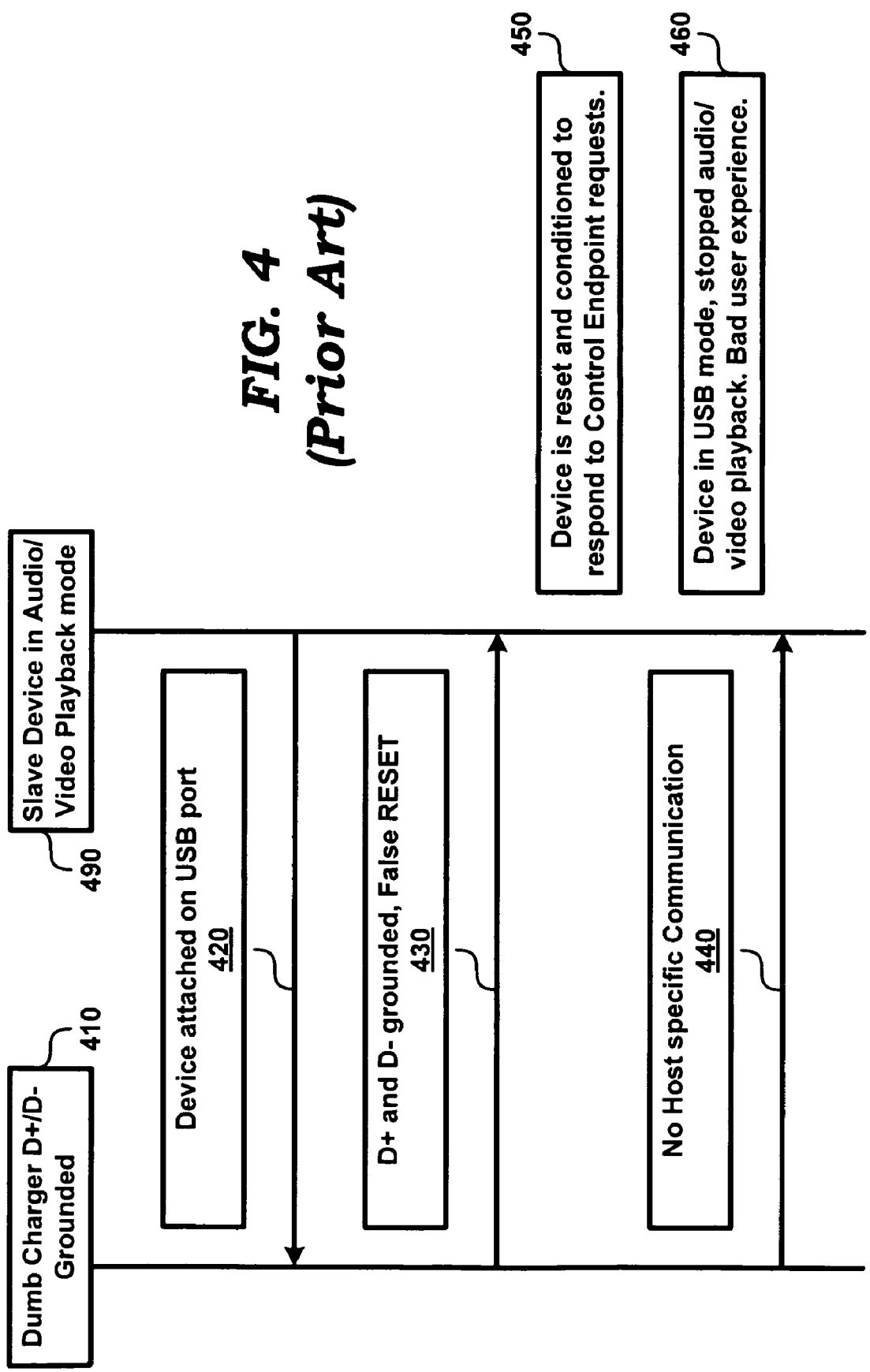
FIG. 4 is a flow diagram illustrating the disruption to user applications due to the dumb charger in an embodiment.

For reasons described above, a slave device may interpret such a signal as a Reset signal from the host. This can be inconvenient at least in some multi-media player type devices, as demonstrated with respect to FIG. 4.

As shown there, a slave device 490 is in playback mode, playing songs/video, etc when connected to dumb charger 410 at time instance t5 (as represented by 420), causing a reset signal to be received in the slave device at time instance t6 (as represented by 430). Slave device 490 may expend processing resources to enter the default mode (as represented by 450), required for establishing communication, as described above with respect to FIG. 2.

However, no communication would be received (as represented by 440) since there is a dumb charger on the other side. Slave device 490 may thereafter wait for a pre-specified duration, before reverting to a state prior to receipt of the reset signal.

Such approaches may reduce or deplete the computational resources provided to audio/video playback, thereby causing the playback to be disrupted/stopped, as represented by 460. It is generally desirable to avoid such quality degradations. Several aspects of the present invention address at least such problems as described below in detail.

5. Establishing Communication

Improved Approach

Figure 5:
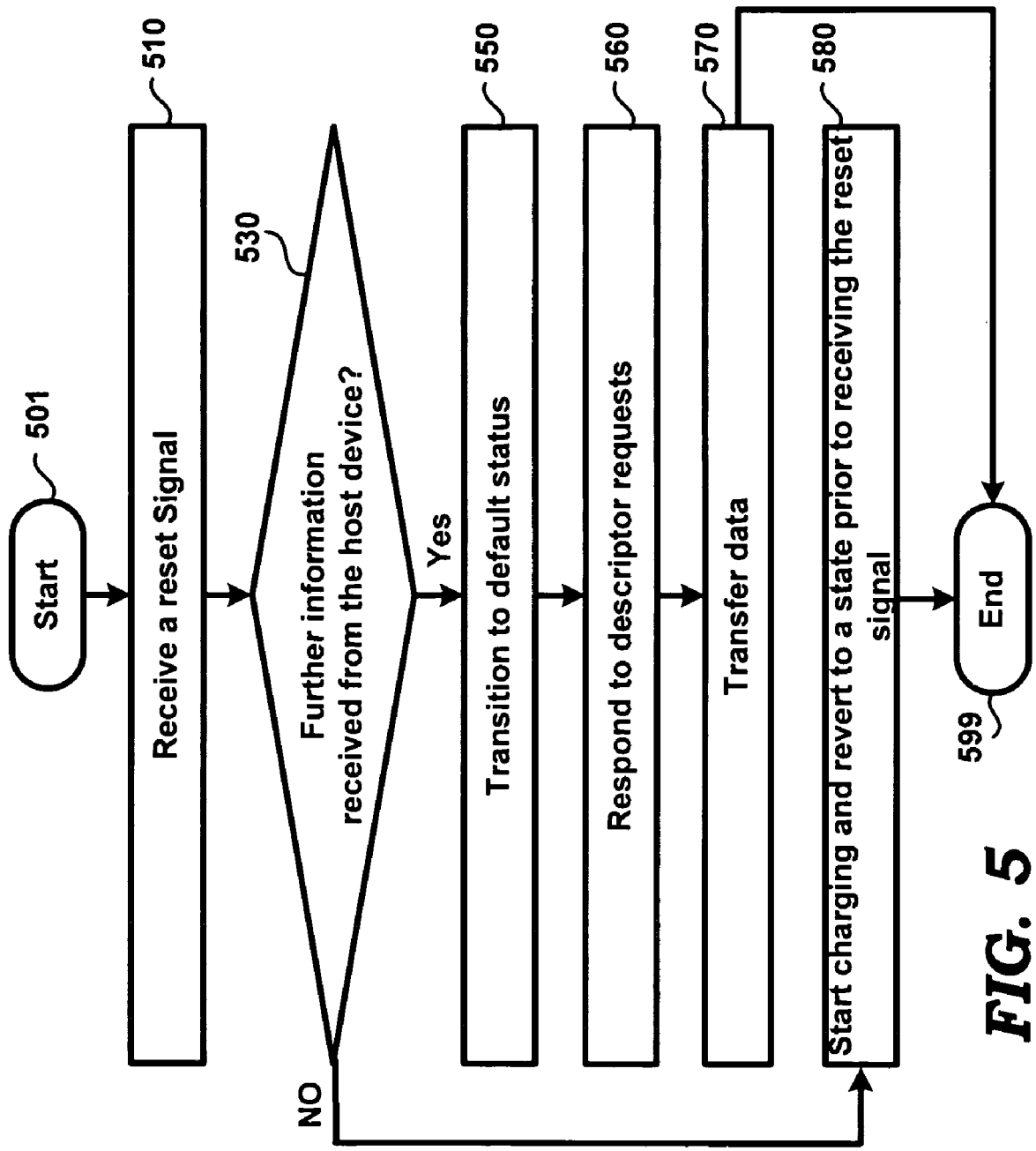
FIG. 5 is a flowchart illustrating the manner in which communication is established according to an aspect of the present invention.

FIG. 5 is a flowchart illustrating the manner in which communication is established according to an aspect of the present invention. The flowchart is described with respect to FIG. 1 and USB for illustration. However, the features can be implemented with respect to other protocols also, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 501, in which control immediately passes to step 510.

In step 510, slave device 130 receives a reset signal. In case of USB, the reset signal is received according to the convention described above. As described above, the reset signal may be a false one (e.g., in case of dumb charger) or a correct one (when connected to a host device).

In step 530, slave device 130 checks whether further information is received from the host. Further information means that there should be more information than the mere assertion of the reset signal on paths 112/113. For example, slave device may check for 3 ms to 6 ms for occurrence of chirp K signal. The reader is referred to a document entitled, USB-IF USB 2.0 Electrical Test Specification available at www.usb.org/developers/compliance/USB-IF_USB_2_0_Electrical_Test_Spec081005.pdf for other reference signals and timing information. Thus, in case of dumb charges, the same state (representing reset signal) would continue to be asserted, while in case of actual host device on the other side, additional data stream would be received.

For example, when USB protocol is used, the additional information may include one or more of start of frame (SOF), descriptor requests, J and K signaling, etc. Ideally, the checking needs to be timed (with appropriate delay) to check for J and K signaling, since that signal is generally received first after reset, for synchronization purpose. However, as additional precaution, slave device 130 may also examine for SOF, which follows the J and K signaling. As further confirmation or precaution, descriptor packets also may be checked for from the host device. A combination of one or more of such examinations may be used to determine whether further communication is received from the host device. Control transfers to step 580 if there is no such additional/further information, and to step 550 otherwise.

In step 580, slave device 130 starts charging the internal batteries, in addition to reverting to a state prior to reception of the reset signal. Thus, interrupt type of approaches can be used to cause the reverting of step 590 to be performed. When exiting from the interrupt processing routine, the prior state would be reverted to. It should be appreciated various other approaches can be used to revert back to the prior state.

Steps 550 and 560 are performed to complete establishing communication with the host device. Thus, in step 550 the slave device is operated to be placed in a default state suitable for responding to the end point requests. In step 560, the responses are generated for the descriptor requests. The two devices are thereafter configured based on the information exchanged. Thus, both the devices are configured for transmission using optimum speeds and corresponding transmission techniques.

In step 570, the data units are transmitted in either direction based on the communication setup. The data units may contain requests and responses. The flowchart ends thereafter in step 599.

From the above, it may be appreciated that the disruption to normal processing is minimal in case of false reset signals, such as when a slave device is connected to a dumb battery charger. In addition, communication is reliably established when the slave device is connected to a host device, as described below in further detail.

6. Slave Device

Figure 6:
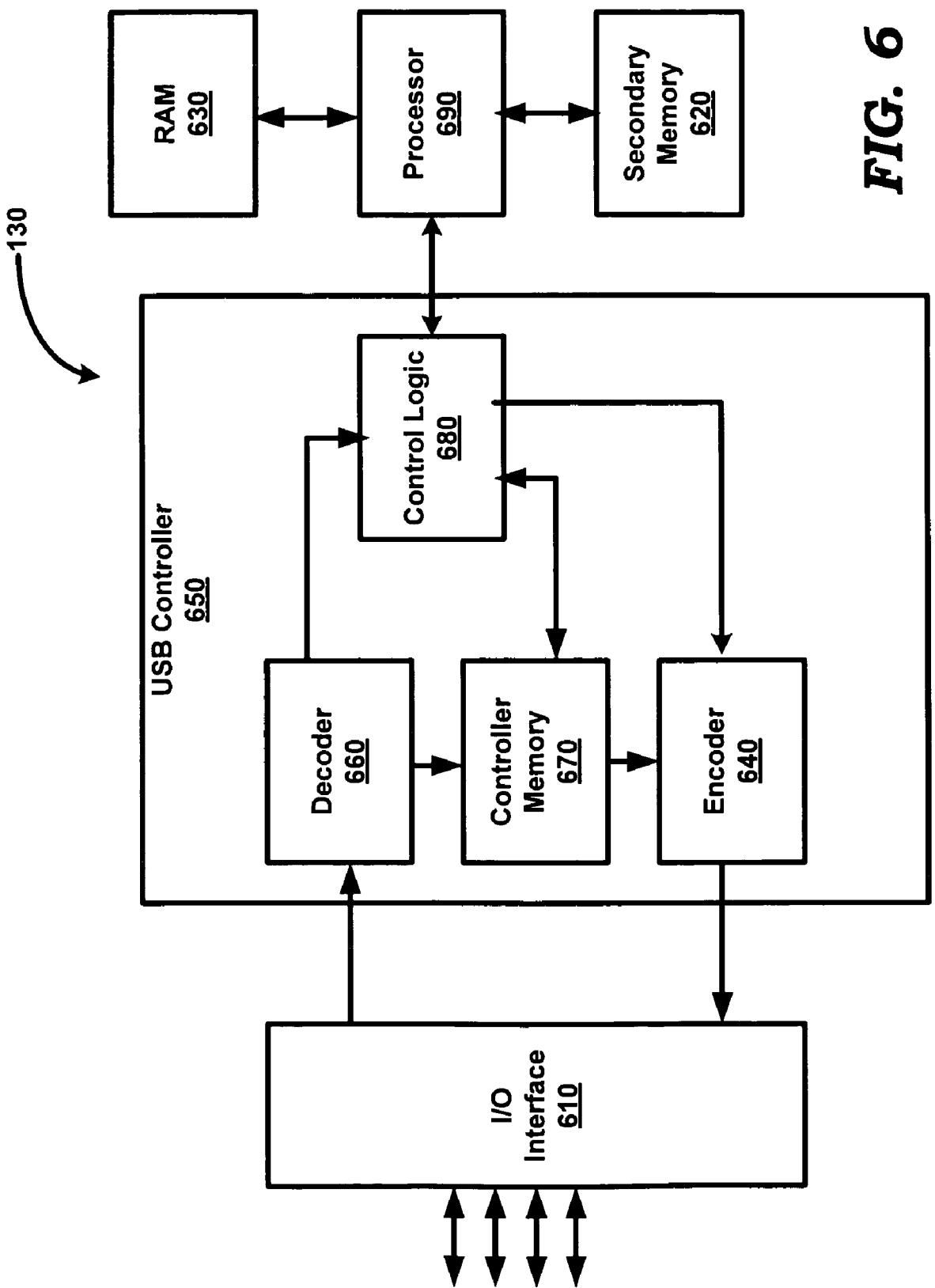
FIG. 6 is a block diagram illustrating the details of a slave device in one embodiment.

FIG. 6 is a block diagram illustrating the details of a slave device 130 in one embodiment. Slave device 110 is shown containing input/output (I/O) interface 610, secondary storage 620, random access memory 630, USB controller 650, and processor 690. USB controller in turn is shown containing encoder 640, decoder 660, controller memory 670, and control logic 680

Secondary storage 620 stores instructions, which when retrieved and executed by processor 690 performs (or causes the performance of) several of the steps of FIG. 5. The secondary storage may be implemented by any non-volatile medium such as NAD/Flash memory, ROM, EEPROM, hard-driver, etc. Secondary storage 620 may further store various instructions representing various user applications (e.g., video/audio player). Secondary storage 620 thus represents a computer readable storage medium from which instructions are retrieved and executed by processor 680 to provide several features of the present invention.

I/O interface 610 provides the physical, electrical and protocol interface to receive power and signals on paths 111-114. With respect to binary information on D+/D− paths, I/O interface indicates the same received levels to decoder 660 according to the voltage levels supported in USB controller 650. Similarly, the I/O interface is used to send data bits on D+/D− paths, with appropriate signal level and frequency. Path 111 may be electrically coupled to a charging circuitry that charges battery (not shown).

Controller memory 670 may contain specific registers to indicate the occurrence of specific conditions/signals on paths D+/D−, and also buffer for storing packets (received or to be sent). The corresponding registers are set by decoder 660 upon detection of the corresponding condition on the input paths 111-114. The registers may include those for indicating the occurrence of a reset condition, receipt of J and K signaling, type of packet (e.g., SOF, EOP, data packet) received, etc. The registers may be memory mapped to the processor address space such that processor 690 can directly access the specific desired register.

Decoder 660 decodes the signals received from I/O interface 610 to detect the receipt of various signals and/or occurrence of conditions (e.g., reset, J and K, SOF, etc., noted above). The detected information may be recorded in the corresponding registers storage 670. When conditions (e.g., reset, completion of receipt of a data packet) requiring communication to the processor 690, decoder 660 interfaces with control logic 680 to cause the corresponding communication (e.g., interrupt) to be provided to processor 690. The decoded data packets are stored in the buffer of storage 670.

Encoder 640 receives payload to be transmitted, adds required header information to form a data packet, and converts the bits of the data packet into corresponding signal levels for transmission by I/O interface 610. The payload may be received from processor 690 or control logic 680.

Control logic 680 provides various data link functions such as acknowledging receipt of data packets, requesting retransmission, hand shaking during transfer of packets, etc. Control logic 680 sends an interrupt to processor 690 upon indication of arrival of a reset request and also other conditions (e.g., upon receipt of a pre-specified number of data packets). Alternatively, control logic 680 may perform the check of step 530 and send an interrupt only if the further information is registered in controller memory 670. Such checking also may be based on software instructions stored on a computer readable storage medium (e.g., internal memory or second memory 620).

Processor 690 executes instructions to provide various user applications, some of which may cause processor 690 to send data packets. In addition, when an interrupt is received from control logic 680, processor may suspend the execution of the presently executed user application, and check the various registers to determine whether a possible reset condition has been received. In such a situation, processor 690 may operate in accordance with steps 530, 580, 550, 560 and 570 (described above) to avoid user applications from receiving reduced resources. Reverting to a previous state in step 580 implies resuming execution of the suspended application.

In particular, minimum computational resources are expended in performing the check of step 530. If a false reset is received, for example, due to the dummy charger, the absence of additional information is confirmed in minimal duration (with minimal computational complexity), thereby avoiding substantial disruption to user applications executing prior to reception of the reset/interrupt. Thus, the duration between suspension and resumption of execution of the application is reduced.

On the other hand, if control logic 680 performs the checking of step 530 before issuing the interrupt signal, the disruption to the applications executing on processor 690 is further reduced.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of interfacing with a host device over a serial bus, said method comprising:
   receiving a reset signal on said serial bus;
   subsequent to said receiving, checking whether information in addition to said reset signal is received on said serial bus; and
   entering a default state operable to establish communication with said host device on said serial bus, wherein said entering occurs if said information in addition to said reset signal is received on said serial bus.

2. The method of claim 1, further comprising:
   prior to said receiving, executing an application in a processor provided in of a slave device, wherein said slave device is operable to interface with said host device;
   suspending execution of said application upon receiving said reset signal; and
   resuming execution of said application if said further information is not received.

3. The method of claim 1 further comprising:
   establishing communication with said host device if said information is received.

4. The method of claim 3, wherein said establishing comprises:
   receiving a sequence of bits on said serial bus in said default state;
   detecting a sequence of end point requests in said sequence of bits by parsing said sequence of bits; and
   responding to said sequence of end point requests.

5. The method of claim 2, wherein said checking is performed by a bus controller external to said processor.

6. The method of claim 2, said method further comprising:
   storing data in a register information associated with a receipt of said reset signal; and
   sending an interrupt to said processor, wherein said processor is operable to examine said register to determine the receipt of said reset signal.

7. The method of claim 1, wherein said information comprises at least one of a synchronization signal and a start of frame indication.

8. The method of claim 7, wherein said serial bus comprises Universal Serial Bus and said synchronization signal comprises J and K signaling.

9. The method of claim 1, further comprising:
   charging a battery using said serial bus if said information is not received, wherein said battery is contained in a slave device that is operable to interface with said host device.

10. A slave device coupled to a serial bus, said slave device comprising:
    an input/output (I/O) interface operable to receive a reset signal on said serial bus, wherein said reset signal is operable to request an establishment of communication between said slave device and a host device responsive to said host device being coupled to said slave device; and
    a processor operable to execute an application, said processor further operable to enter a state operable to establish communication between said slave device and said host device responsive to said slave device receiving information in addition to said reset signal on said serial bus.

11. The slave device of claim 10 further comprising:
    a serial bus controller operable to check whether said information is received on said serial bus, and wherein said serial bus controller is further operable to generate an interrupt to said processor responsive to receiving said information on said serial bus, wherein said interrupt is operable to cause said processor to suspend execution of said application.

12. The slave device of claim 10 further comprising:
    a battery operable to be charged if coupled to a charger and if said information in addition to said reset signal is not received on said serial bus.

13. The slave device of claim 10, wherein said serial bus comprises a Universal Serial Bus (USB), and wherein said information comprises at least one of a J and K signal and a start of frame packet.

14. A computer readable medium comprising instructions that when executed implement a method of establishing communication interface between a slave device to interface with and a host device over a serial bus, said method comprising:
    receiving a reset signal on said serial bus;
    subsequent to said receiving, checking whether information in addition to said reset signal is received on said serial bus; and
    entering a default state operable to establish communication with said host device on said serial bus, wherein said entering occurs if said information in addition to said reset signal is received on said serial bus.

15. The computer readable medium of claim 14, wherein said method further comprises:
    prior to said receiving, executing an application in a processor of said slave device, wherein said slave device is operable to interface with said host device;
    suspending execution of said application upon receiving said reset signal; and
    resuming execution of said application if said information is not received.

16. The computer readable medium of claim 15, wherein said establishing comprises:
    receiving a sequence of bits on said serial bus in said default state;
    detecting a sequence of end point requests in said sequence of bits by parsing said sequence of bits; and
    responding to said sequence of end point requests.

17. The computer readable medium of claim 15, wherein said checking is performed by a bus controller external to said processor.

18. The computer readable medium of claim 15, wherein said method further comprises:
    storing data in a register information associated with a receipt of said reset signal; and
    sending an interrupt to said processor, wherein said processor is operable to examine said register to determine the receipt of said reset signal.

19. The computer readable medium of claim 18, wherein said information comprises at least one of a synchronization signal and a start of frame indication.

20. The computer readable medium of claim 15, wherein said method further comprises:
    charging a battery using said serial bus if said information is not received, wherein said battery is contained in said slave device that is operable to interface with said host device.

* * * * *